United States Patent [19]

Stead

[11] Patent Number: 4,998,508
[45] Date of Patent: Mar. 12, 1991

[54] CONDENSING TYPE BOILERS

[75] Inventor: Ronald Stead, Annan, Scotland

[73] Assignee: Northern Engineering Industries PLC, Newcastle upon Tyne, England

[21] Appl. No.: 352,561

[22] Filed: May 16, 1989

[30] Foreign Application Priority Data

May 20, 1988 [GB] United Kingdom ............... 8812021
May 20, 1988 [GB] United Kingdom ............... 8812022

[51] Int. Cl.⁵ ..................... F23C 11/02; F22B 31/04
[52] U.S. Cl. ................................. 122/4 D; 122/22; 110/245; 110/254
[58] Field of Search ............... 432/58; 110/245, 254; 122/4 D, 22

[56] References Cited

U.S. PATENT DOCUMENTS

| | | | |
|---|---|---|---|
| 3,509,834 | 5/1970 | Rosenberg et al. | 110/254 |
| 4,267,801 | 5/1981 | Robinson | 110/245 |
| 4,270,468 | 6/1981 | Robinson et al. | 110/245 |
| 4,273,073 | 6/1981 | Robinson | 122/4 D |
| 4,344,371 | 8/1982 | Zoschak | 110/229 |
| 4,393,814 | 7/1988 | Sievert | 122/22 |
| 4,434,723 | 3/1984 | Brealey et al. | 432/58 |

Primary Examiner—Henry C. Yuen
Attorney, Agent, or Firm—Rosen, Dainow & Jacobs

[57] ABSTRACT

A boiler comprises a shell for fluid to be treated and divided into first and second heat exhange zones by at least one baffle, the zones being in communication with one another beneath a lower end of the baffle. Exhaust gases from a combustion source are supplied to a plurality of heat exchange tubes extending through each zone in heat exchange relationship with the fluid in the shell and being arranged in passes sequentially connected to one another whereby the exhaust gases pass sequentially through the first and second zones. The fluid to be heated is fed to an upper region of the second zone such that the temperature of gases passing through at least some of the tubes in the second zone falls to below the dew points of combustion products therein, the tubes in which condensation occurs being orientated such that condensates flow therefrom for disposal.

1 Claim, 3 Drawing Sheets

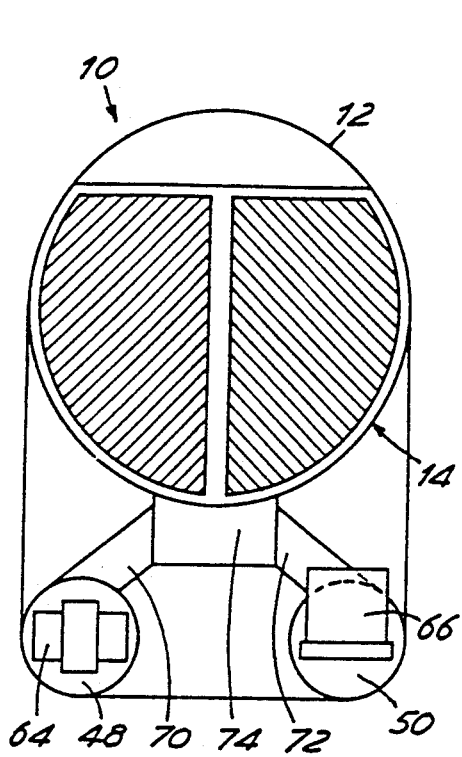
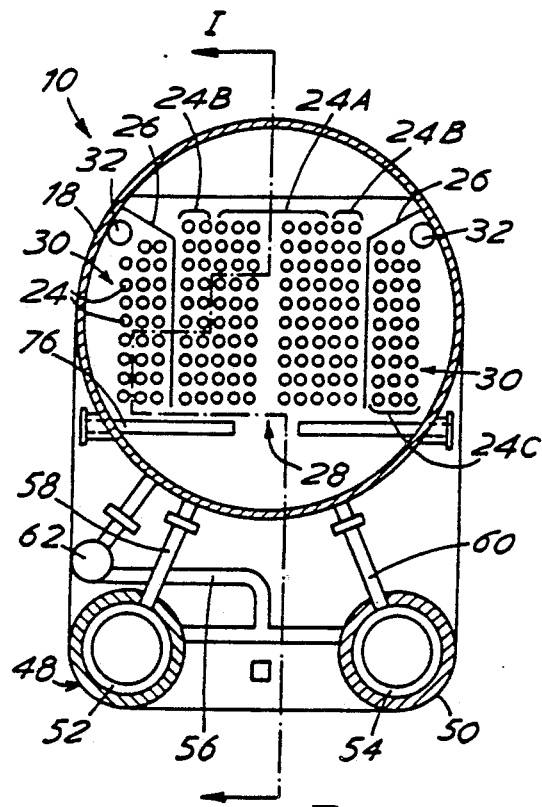
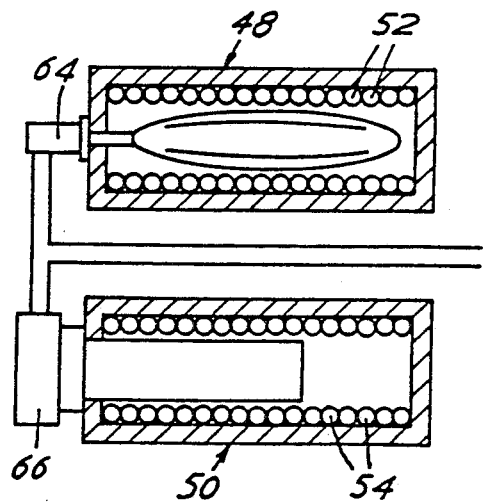

1

CONDENSING TYPE BOILERS

BACKGROUND OF THE INVENTION

This invention relates to boilers.

Boilers which have a pressure shell for containing fluid, such as water or other thermal liquid, are known. Typically, a furnace tube in which fuel is burnt extends at least partly through the shell and is connected at its exhaust end via a smoke or reversal chamber to the first of a plurality of groups or passes of tubes which extend through the shell in heat exchange relationship with the fluid contained therein.

Usually such boilers are operated so that the exhaust gases passed to the stack are still above the dew point of the products of combustion contained in said gases. Consequently, corrosion problems from condensation of acidic combustion products are avoided, and relatively inexpensive materials can be used in the manufacture of the boilers.

The operation of such boilers in that mode means that some of the recoverable heat within the exhaust gases is lost, the heat contained in the exhaust gases being in the form of both sensible heat of the gases and the heat of vaporisation of the condensable combustion products. However, with the recent emphasis on energy conservation, it can be desirable to maximise the recovery of heat even at the expense of higher initial capital outlay.

SUMMARY OF THE INVENTION

It is an object of the invention to provide a boiler in which the aforementioned heat losses are reduced or obviated.

According to the present invention there is provided a boiler comprising a shell for containing fluid to be heated, at least one baffle dividing said shell into first and second heat exchange zones, said zones being in communication with one another beneath a lower end of said baffle, a plurality of tubes for carrying heat-containing gases from a combustion source, the tubes extending through each zone in heat exchange relationship with said fluid and being arranged in passes sequentially connected to one another whereby said gases pass sequentially through said first and second zones, and fluid feed means for feeding said fluid into an upper region of said second zone whereby the temperature of said gases passing through at least some of said tubes extending through said second zone is reduced to below the dew points of combustion products contained in said gases, the orientation of tubes extending through said second zone in which condensation occurs being such that condensates flow therefrom for disposal.

Preferably, said shell comprises a hollow cylindrical body the central longitudinal axis of which extends substantially horizontally, the body being closed at each end by a respective end plate and said tubes extending between, and being in sealed relationship with, said end plates.

Conveniently, two baffles divide said shell into said zones, said baffles extending axially of said shell body and depending from an upper part thereof one to each side of a vertical plane including the central longitudinal axis of said shell body, the space between said baffles comprising said first zone and the spaces between each baffle and the adjacent wall of said shell body comprising said second zone.

The boiler according to the invention may be oil and/or gas fired or may be solid fuel fired, although it is preferred that the boiler has a multiple fuel firing capability, the combustion source comprising first and second combustion chambers located externally of the shell and having, respectively, fluid fuel firing means and solid fuel firing means.

Such an arrangement means that it is always possible to use the most economical fuel available at the time without having to undergo the relatively difficult and expensive exercise of converting a fluid fuel fired boiler to solid fuel firing (and vice versa).

Preferably the defining walls of each combustion chamber comprise heat exchange means connected to the shell and through which fluid from the shell circulates.

Electrical or fluid heating means may be located within the shell.

BRIEF DESCRIPTION OF THE DRAWINGS

FIG. 3 is a schematic end view on arrow III in FIG. 1;

FIG. 4 is a schematic section on line IV—IV in FIG. 1, and

FIG. 5 is a schematic horizontal diametrical section of the combustion chambers of the boiler of FIG. 1 to 4.

DESCRIPTION OF THE PREFERRED EMBODIMENT

Figure 1:
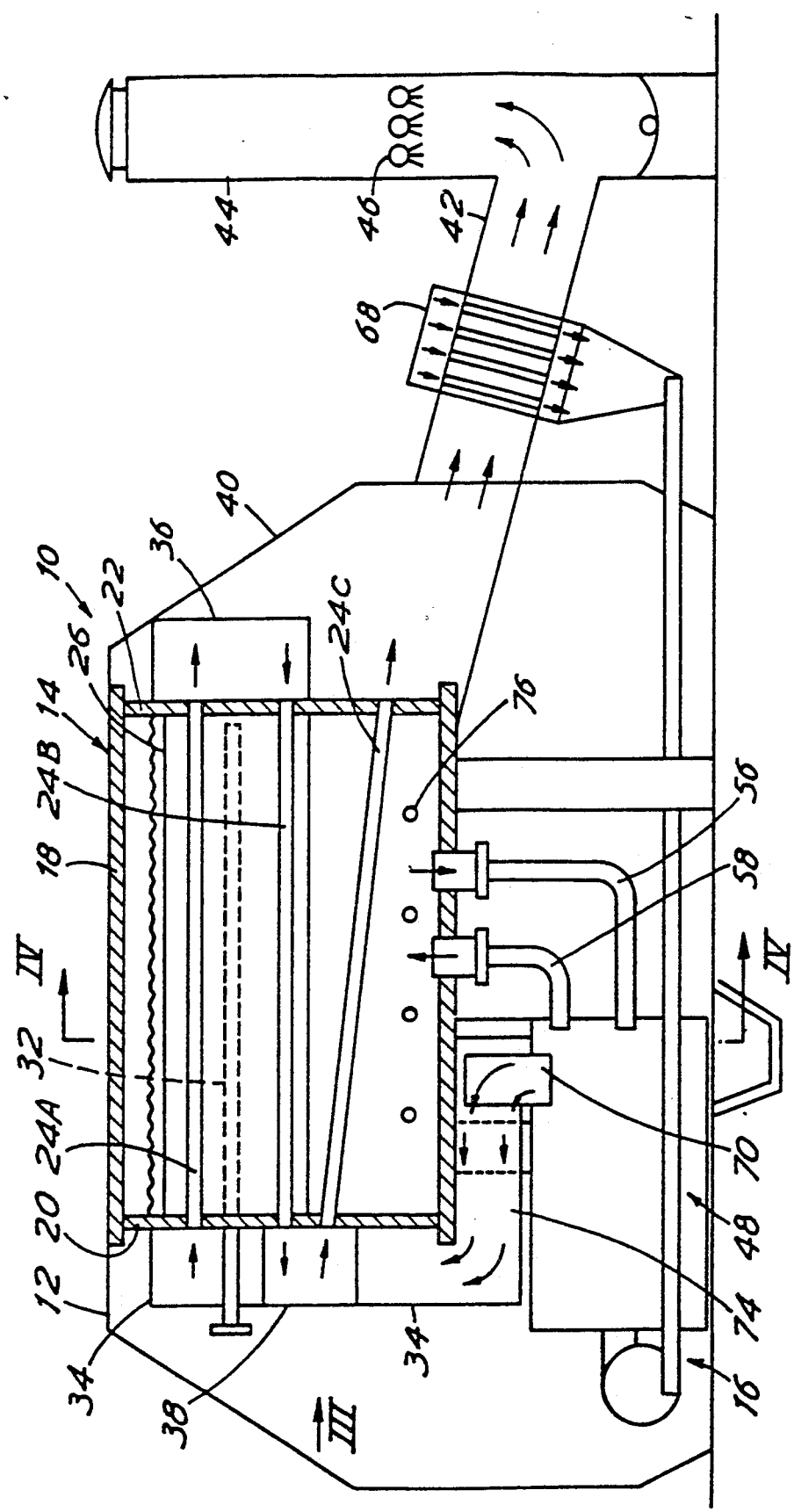
FIG. 1 is a schematic section on line I—I in FIG. 4 of a boiler according to the invention, only a minimal number of tubes being illustrated for clarity.
Figure 2:
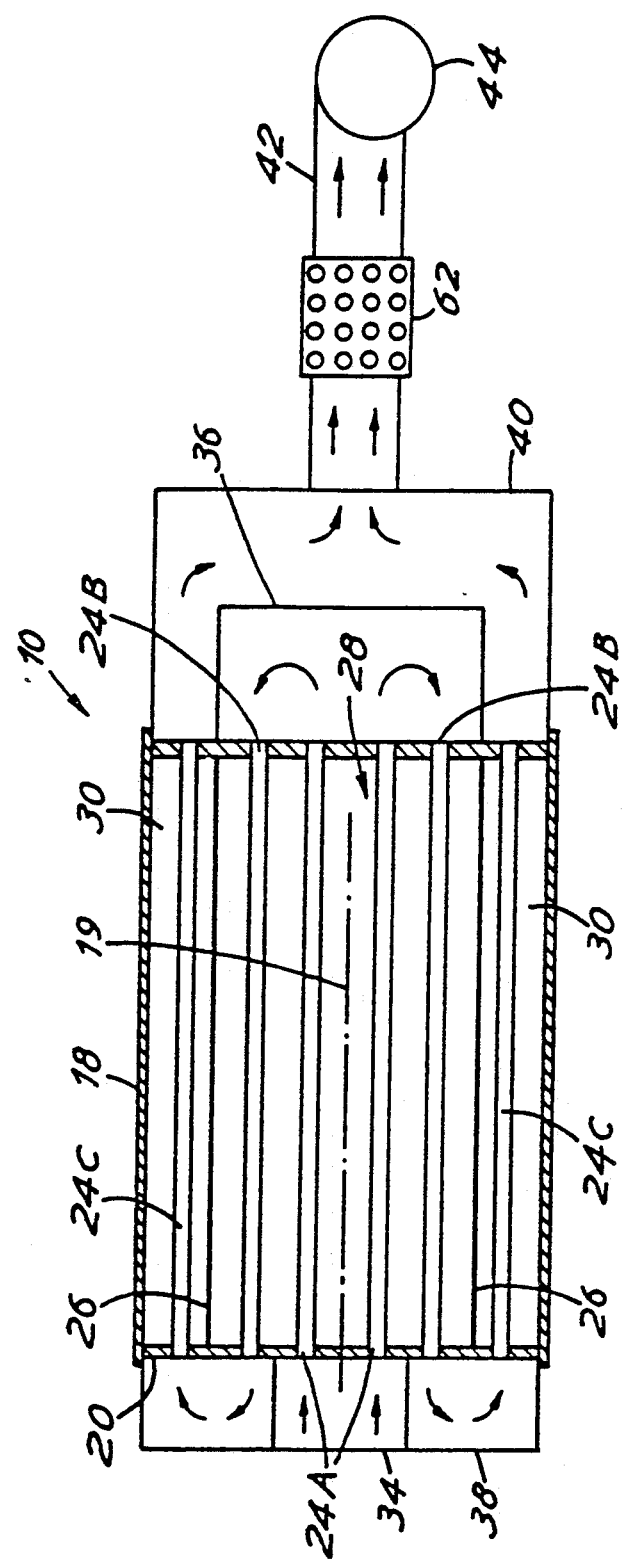
FIG. 2 is a schematic sectional plan taken on the horizontal diameter of the shell body of the boiler shown in FIG. 1, only a minimal number of tubes being illustrated for clarity.

Referring to the drawings, the illustrated boiler indicated generally at 10, is a package steam boiler consisting of an insulated housing 12 within which are mounted an insulated shell 14 and insulated furnace means 16.

The shell 14 has a horizontally-orientated, hollow cylindrical body 18 closed at each end by end plates 20,22. A plurality of tubes 24 extend through the shell 14 in heat exchange relationship with water contained within the shell 14, said tubes 24 being sealed into corresponding holes in the end plates 20,22. The tubes 24 are arranged in groups to form a series of sequential passes for exhaust gases issuing from the furnace means 16. The tubes 24 are arranged to constitute first, second and third passes for the gases within the shell as is more fully described below.

The shell body 18 is divided into first and second zones by two baffles 26 which extend axially of the shell body 18 and depend from an upper part thereof one to each side of a vertical plane including the central longitudinal axis 19 of the shell body 18. The space 28 between the two baffles 26 constitutes the first zone and the spaces 30 between each baffle 26 and the adjacent wall of the shell body 18 constitute the second zone as best seen in FIG. 4. The zones 28,30 are in communication with one another beneath the lower ends of the baffles 26. It should be noted that, in some instances, it will be necessary to provide small holes in the tops of the baffles 26 to allow any vapour generated in the zones 30 to escape into the upper part of the zone 28.

The tubes 24 extending through the first zone 28 are divided into an inner pass 24A and an outer pass 24B comprising the first and second passes respectively referred to above for the exhaust gases. Both passes 24A and 24B function as evaporator sections.

The tubes 24 extending through the second zones 30 constitute the third pass 24C and function as an economiser section, feed water being introduced into the upper regions of the zones 30 through distributors 32. The tube passes are designed such that the temperature of the gases in the pass 24C can be reduced to below the dew points of combustion products forming part of the exhaust gases thereby to condense such products and recover the latent heat of vaporisation thereof in addition to the sensible heat of the gases. Thus, the tubes 24 in the pass 24C can be inclined downwardly from their inlet ends to their outlet ends so that condensate does not collect in those tubes 24. The tubes 24 in which condensation occurs are manufactured from corrosion-resistant materials as are other boiler components which are exposed to the condensates.

Smoke box arrangements 34,36,38 and 40 ensure the exhaust gases flow as indicated by the arrows in sequence through the passes 24A, 24B and 24C. The smoke box 40 is connected by a duct 42 to a stack 44 in which the exhaust gases can be treated by a gas scrubber 46.

The exhaust gases are provided by the furnace means 16, which is mounted below the shell 14, and which consists of two parallel, insulated combustion chambers 48,50. The chambers 48,50 are lined with heat exchangers such as tubes 52,54, respectively. Water is circulated from the shell 14 through the tubes 52,54 and separate outlet pipes 58,60 respectively. Circulation of water through the tubes 52,54 can be natural or, as in this embodiment, through a common inlet pipe 56 and controlled using a pump 62.

Burners 64,66 are mounted in one end wall of each chamber 48,50 respectively as best seen in FIG. 5. The burner 64 is a dual fuel (i.e. gas or oil) burner and the burner 66 is a coal or other solid fuel (e.g. fibrous or waste materials) burner. A heat exchange unit 68, which is located in the duct 42, is used to pre-heat the air supplied to the burners 64,66.

Exhaust gas ducts 70,72 from the combustion chambers 48,50 respectively, lead to a common duct 74 beneath the shell body 18 which in turn leads into the smoke box 34 for the first pass of tubes 24 within the shell 14. It will be appreciated that the exhaust gases within the combustion chambers 48,50, prior to their passage into the tubes 24 within the shell 14, serve to effect preliminary heating of the fluid within the shell 14 by heat exchange with said fluid in the heat exchange tubes 52,54.

Electrical heating elements, steam or hot water distribution pipes 76 extend into the lower part of shell body 18 along the sides thereof. The elements 76 may be used during warm up and to permit greater flexibility of fuel usage during part-load operation.

Thus it will be appreciated that boilers as described above and constructed in accordance with the invention are adapted to recover the latent heats of vaporisation of the condensable combustion products as well as additional sensible heat contained in the exhaust gases, thereby increasing the efficiency of such boilers compared with boilers in which the latent heats are not recovered.

More particularly the provision of internal baffling within the boiler enables feed water to flow over an economiser section and evaporator section of heat transfer surface whereon the products of combustion are condensed in a controlled manner to remove the latent and sensible heat of the vapours borne in the products of combustion as well as the sensible heat of the exhaust gases themselves. Clearly such an arrangement considerably improves the efficiency of the boiler while additionally serving to control pollutant emissions therefrom.

Under certain conditions of operation of the illustrated arrangement, some tubes 24 of an evaporator pass, such as the passes 24B and 24C, can also be cooled by fluid from the second zone 30. In such a case, and if the boiler design is such that combustion products condense in some of the tubes 24, those tubes will be orientated to allow drainage of the condensates.

The provision of separate combustion chambers 48,50 permits a wide flexibility of fuel usage, therefore enabling cost-effective energy management to be practised with any combination of available fuels. Additionally it is possible, for a given size of boiler, for the heat exchange tubes 52,54 of the chambers 48,50, respectively, and the tubes 24 in the passes 24A, 24B and 24C to be designed to give a specified output or MCR (maximum continuous rating) for either fluid fuel or solid fuel or a combination thereof.

If high gas temperatures are required in the tube passes 24A,24B, 24C within the shell body 18, the heat exchange tubes 52,54 in the combustion chambers 48,50 may be replaced by a lining of refractory material. In an alternative arrangement, the tubes 52,54 may be replaced by other heat exchange means such as cylinders defining annuli which may be zoned by baffles.

In an unillustrated embodiment of the basic invention the exhaust gases can be derived from other external sources such as diesel/generator sets, or, alternatively, the shell can have a furnace tube extending through the lower part of the first zone, the provision of such a furnace tube being well known in the art.

In retrofit operations, existing boilers can be modified to have a construction according to the present invention.

What I claim and desire to secure by Letters Patent is:

1. A boiler comprising a shell for containing fluid to be heated, at least one baffle dividing said shell into first and second head exchange zones, the second zone having an upper region and the baffle having a lower end, said zones being in communication with one another beneath said lower end of the baffle, a combustion source external of the shell producing heat-containing gases, a plurality of tubes to which said heat-containing gases are supplied, the tubes extending through each zone in the heat exchange relationship with said fluid and being arranged in passes sequentially connected to one another whereby said gases pass sequentially through said first and second zones, and fluid feed means for feeding said fluid into the upper region of said second zone whereby the temperature of said gases passing through at least some of said tubes extending through said second zone can be reduced to below the dew points of combustion products contained in said gases, the orientation of tubes extending through said second zone in which condensation occurs being such that condensates flow therefrom for disposal, said shell further comprising a hollow cylindrical body having a pair of opposed ends and a central longitudinal axis, said axis extending substantially horizontally, a pair of end plates closing respective ends of the body, and said tubes extending between, and being in sealed relationship with, said end plates, and wherein the shell has an upper part, two baffles dividing said shell into said zones, said baffles extending axially of said shell body and depending from said upper part thereof one to each side of a vertical plane including the central longitudinal axis of said shell body, the baffles defining between them a space comprising said first zone and each baffle and the adjacent wall of said shell body defining between them respective spaces together comprising said second zone.

* * * * *